(No Model.)
D. A. BARNES.
PIPE COUPLING.
No. 481,250. Patented Aug. 23, 1892.
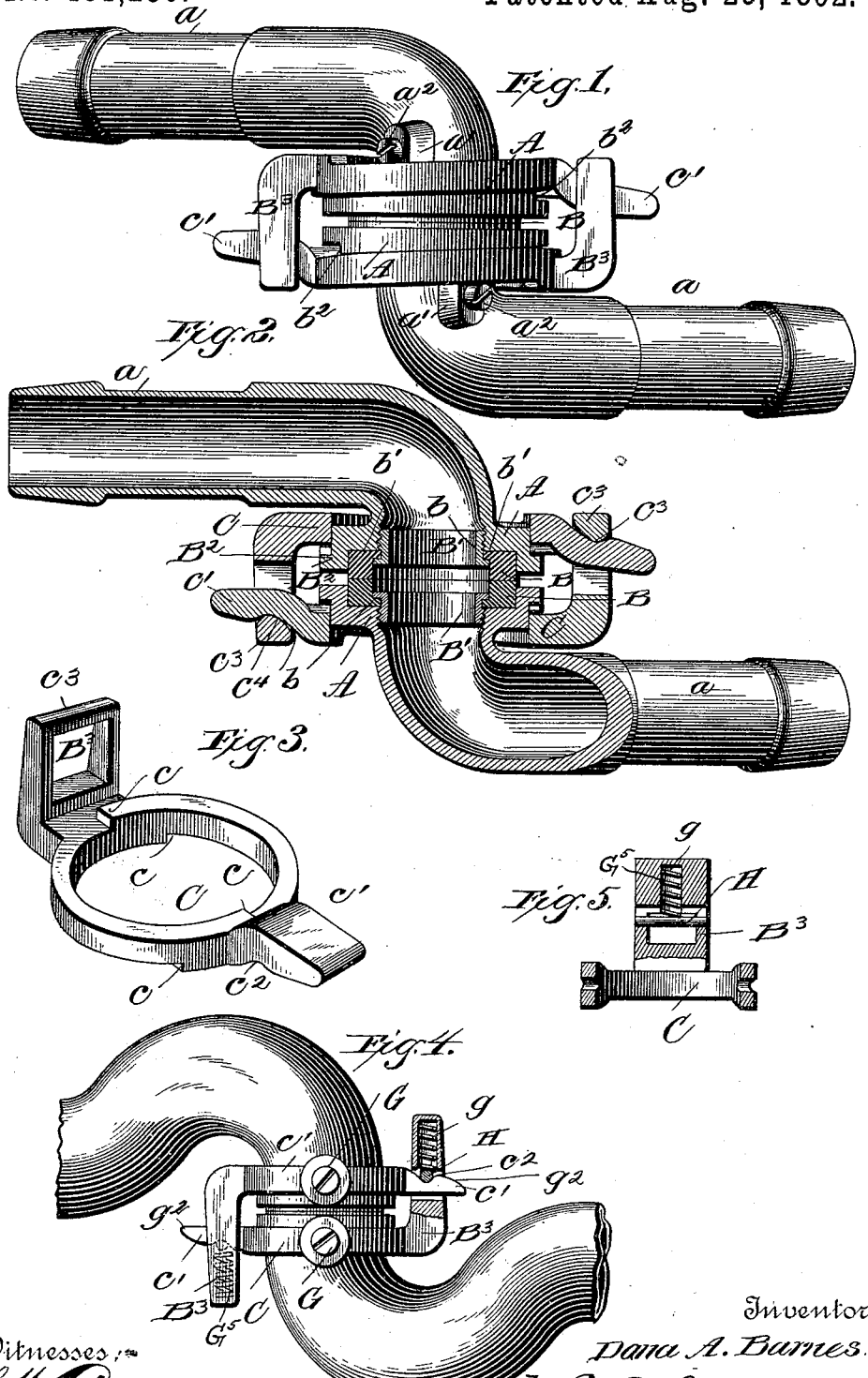
Witnesses:
E. C. Wurdemann
L. C. Hills
Inventor:
Dana A. Barnes.
by E. B. Stocking
Attorney

UNITED STATES PATENT OFFICE.

DANA A. BARNES, OF SYRACUSE, NEW YORK.

PIPE-COUPLING.

SPECIFICATION forming part of Letters Patent No. 481,250, dated August 23, 1892.

Application filed July 6, 1891. Serial No. 398,479. (No model.)

*To all whom it may concern:*

Be it known that I, DANA A. BARNES, a citizen of the United States, residing at Syracuse, in the county of Onondaga, State of New York, have invented certain new and useful Improvements in Automatic Pipe-Couplings, of which the following is a specification, reference being had therein to the accompanying drawings.

This invention relates to certain new and useful improvements in automatic couplings for pipes for steam or air or water-pipes or hose of that class in which are employed double cam-surfaces and engaging parts on the two couplings.

The invention has for its objects, among others, to provide an improved coupling of this character which shall be simple, cheaply constructed, durable, and efficient, and which shall lock by gravity, requiring the minimum amount of attention on the part of the person engaged in coupling.

A further object is to provide a sufficient rocking movement to permit slight play of the rings to allow them to accommodate themselves to varying positions they may assume.

I provide spiral-shaped rings and yokes which revolve freely on the spiral shoulder of the coupling-body, each ring being provided with a tongue designed to engage the yoke of the other ring and provided with suitable means for holding the said parts together. The cam-rings are provided with stops to engage stops on the coupling-body for a purpose hereinafter made apparent.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a plan view of my improved coupling. Fig. 2 is a longitudinal section through the same. Fig. 3 is a perspective view of one of the cam-rings and yoke detached. Fig. 4 is a plan of a modified form. Fig. 5 is a cross-section through the ring and yoke of the form shown in Fig. 4.

Like letters of reference indicate like parts throughout the several views in which they occur.

Referring now to the details of the drawings by letter, A designates the body of the coupling, and as the two halves are substantially alike a description of the construction of the one will suffice for both. The coupling-body is formed with a hose-receiving shank or nozzle $a$, which may be of any well-known or approved form of construction. The body is also provided with lugs or bosses $a'$ upon diametrically-opposite sides and through which or into which bosses are tapped, the screws $a^2$, which serve to retain the rings in place after having been placed upon the body portion, the said rings resting upon the screw-heads, as seen in Fig. 1.

The body portion is formed with a cam-face and with an interior socket or recess in which is fitted a packing-ring B of any suitable material and held therein by the exteriorly-threaded ring B' which has a flange $b$ at its outer edge to engage over a flange $b'$ on the packing-ring, as seen in Fig. 2. The outer face of the body portion is arranged to constitute an overhanging annulus $B^2$, as seen best in Fig. 2, the under face of which is formed upon double inclines with shoulders $b^2$ at the terminus of the inclines or cams, as seen in Fig. 1.

C is a ring of such diameter as to loosely embrace the body portion of the coupling, as seen in Fig. 2, and this ring is formed upon opposite faces with opposite inclines with shoulders $c$, formed at the terminus of the inclines or cams, and upon its outer face opposite one of these shoulders there extends a lip or tongue $c'$, which is tapered, as seen best in Fig. 3, and the under side of which is provided with a depression $c^2$, as seen in Figs. 2 and 3, to receive the cross-bar of the yoke of the opposite ring, as seen in Fig. 2. Upon the opposite side of the ring there extends at right angles to the plane thereof the yoke $B^3$, the inner face of the cross-bar $c^3$ of which is rounded or formed substantially cam-shaped, as seen at $c^4$ in Fig. 2 to engage the depression in the lip or tongue of the opposite ring, as seen in the same figure.

In assembling the parts the screws are removed from the bosses of the body portion and the rings slipped over the nozzles and to embrace the ring portion of the body, as seen in Fig. 2, and then the screws are secured in the bosses. This prevents displacement of the rings and yet allows slight rocking or oscillating movement thereof upon the ring portions of the bodies of the couplings.

To couple all that it is necessary to do is to insert the lips or tongues of the two rings in the yokes, the parts being held in a horizontal plane. They are then shoved together and dropped. The dropping causes them to tighten, owing to the engagement of the oppositely-disposed cams of the two rings, and a tight joint is thus formed. A reverse movement of the parts permits the same to be uncoupled.

In the construction shown in Figs. 4 and 5 the rings are pivoted on the body portions by the pivots G, the said rings being provided with the yokes and lips or tongues to engage the same; but the yokes are provided with a chamber $g$, in which is arranged a spring G', which carries a transverse pin H, which has movement in a slot therein, as seen best in Fig. 5, the said pin being designed to engage the depression $c^2$ in the lip or tongue of the ring, as shown in Fig. 4. The ends of the lips are beveled, as seen at $g^2$ in Fig. 4, and as the two portions of the coupling are brought together the ends of the lips ride under the pins and force them into their chambers sufficiently to permit the passage of the tongues into the yokes when the springs force the pins into the depressions of the lips or tongues and hold the parts firmly together. The rocking movement or oscillation provided the rings permits them to readily accommodate themselves to varying positions of the coupling without displacement.

Modifications in detail may be resorted to without departing from the spirit of the invention or sacrificing any of its advantages.

What I claim as new is—

1. In a coupling of the class described, the combination, with the heads having cam-faced flanges, of cam-rings having oscillatory bearings directly on the heads and formed to connect with each other, as set forth.

2. The combination, with the heads, of the cam-rings, each provided with a tongue, and a yoke projecting from diametrically-opposite sides and at right angles to each other, the tongue of one constructed and arranged to pass into the yoke of the other, as set forth.

3. The combination, with the heads, of the cam-rings, each provided with stop-shoulders diametrically arranged, and a tongue and a yoke projecting from diametrically-opposite sides and at right angles to each other, the tongue of one arranged to enter and engage the walls of the other, as set forth.

4. The combination, with the heads formed with overhanging annuli, of the cam-rings embracing the heads and formed with tongues and yokes, the tongues being formed with cam depressions on their acting faces and the yokes with projections constructed to ride into and engage said depressions, as set forth.

5. In a coupling of the class described, a ring formed with opposite cam-surfaces, a tongue, and a yoke, said tongue and yoke projecting from diametrically-opposite sides and the yoke having an opening inclosed on three of its sides, as set forth.

6. In a coupling of the class described, a ring having oppositely-extended cam-surfaces, stop-shoulders upon substantially diametrically-opposite sides, a tongue, and a yoke, said tongue and yoke projecting from diametrically-opposite sides, as set forth.

7. In a coupling of the class described, a ring having oppositely-extending cam-surfaces, stop-shoulders, a lip or tongue with a depression on its acting face and a beveled end, and a diametrically-opposite yoke having a cross-bar with cam end face combined with a like ring and body portion for each ring, as and for the purpose specified.

In testimony whereof I affix my signature in presence of two witnesses.

DANA A. BARNES.

Witnesses:
 J. W. BARNES,
 L. H. FOWLER.